United States Patent [19]

Seesholtz

[11] Patent Number: 5,105,892
[45] Date of Patent: Apr. 21, 1992

[54] HOOFPACKING FOR HORSES

[75] Inventor: Gary Seesholtz, Chesterland, Ohio

[73] Assignee: Ultraflex Co., Cleveland, Ohio

[21] Appl. No.: 613,315

[22] Filed: Nov. 14, 1990

[51] Int. Cl.⁵ .................... A01L 1/00; A01L 7/02
[52] U.S. Cl. ................................ 168/27; 168/26
[58] Field of Search ............. 168/2, 26, 27, 29; 52/514

[56] References Cited

U.S. PATENT DOCUMENTS

| | | | |
|---|---|---|---|
| 189,517 | 4/1877 | Stockder | 168/27 |
| 461,160 | 10/1891 | Meitzler et al. | 168/28 |
| 629,234 | 7/1899 | Cahill | 168/26 |
| 914,003 | 3/1909 | Woolverton | 168/27 |
| 1,201,973 | 10/1916 | Kendall | 168/29 |

Primary Examiner—Robert P. Swiatek
Attorney, Agent, or Firm—Jones, Day, Reavis & Pogue

[57] ABSTRACT

A packing pad for application to a horse's hoof that is capable of protecting the hoof by providing a cushion against bruising while simultaneously enabling treatment of an injured hoof by forming a water repellent barrier to hold medication against the hoof and to protect against contamination of the hoof.

13 Claims, 1 Drawing Sheet

HOOFPACKING FOR HORSES

TECHNICAL FIELD

The present invention relates to a packing material for horses' hooves and, in particular, relates to a polypropylene packing that is water-repellent to protect against contamination of the hoof and that is capable of holding medication for application to the hoof.

BACKGROUND OF THE INVENTION

It is well known that horses' hooves must be carefully watched and cared for to prevent injury such as tenderness and soreness and, also, to treat injuries such as open wounds and the like. In the past the horses' hooves have been protected and the various ailments of a horse's hoof have been treated with bandages or pads that kept the horse's hoof moist, or a medication was applied to the hoof to heal inflammations, sores and the like.

Hoof pads made either of leather or plastic are frequently installed between the horseshoe and the hoof to absorb shock and protect the hoof. Because of the concavity of the heel, the area between the hoof pad and the hoof must be packed (1) to prevent entry of stones, sand and debris which can cause bruising and soreness, (2) to prevent accumulation of dirt and manure which can cause fungal and bacterial infections (thrush is the most common), and (3) to prevent entrapment of moisture which can cause excessive hydration causing the hoof to become spongy.

The prior art materials used for such packing included packings, usually petroleum based, of a gummy consistency, plumbers oakum, cotton batting soaked in hoof preparation or medication, foam rubber saturated with hoof preparation or medication or silicone.

There are several problems with these prior art pads. They allow entry of stones and debris into the packing, absorb water which aids in contamination or further infection of the afflicted area, do not maintain their original size and loft, become unevenly distributed, and in many cases shrink when medication or other fluid is applied. Thus, as the horse's foot moves the gummy packings, the oakum or the cotton batting, they tend to compress and bunch up under the pad at the toe. They no longer uniformly fill the area where they were placed to protect and sometimes these materials themselves are the cause of bruising and lameness. Further, with movement of the cotton batting and foam rubber, they release the medication they were carrying and thus no longer treat the infected areas. Also, they can trap water which, in addition to causing a spongy hoof and stimulating the growth of bacteria and fungus, commonly cause a sufficient change in the weight of the foot and affect adversely the gait of the horse. Finally, silicone does not move, but it is acid based and causes drying and cracking of the hoof and can lead to acute contraction of the tissues.

When attempting to apply medication to the foot, cotton or gauze was medicated and taped to the foot with veterinary tape. Sometimes an outer layer of duct tape or a plastic garbage bag was added in an attempt to prevent urine, feces and the like from invading the dressing.

The present invention overcomes the disadvantages of the prior art by providing a synthetic packing of a material such as melt-blown polypropylene which remains flat and stays in place 4–6 weeks of the shoeing cycle because the interconnection of fibers stabilizes the material. It does not absorb water and thus forms a water repellent barrier against contamination. The polypropylene packing pad will hold medication in contact with the horse's hoof while simultaneously keeping water or moisture out of the packing. It will maintain its original size and loft, does not shrink, bunch or move in any way, has a high tensile strength, and does not separate upon removal. Further, the packing provides a cushion for the affected area. Also, it can be nailed through to further hold it in place under a leather or plastic pad that is placed between the hoof and horseshoe and nailed.

The novel packing may be used with or without medication. If used without medication, because it does not absorb water, it forms a water repellent barrier against contamination of the affected area of the horse's hoof. It further prevents entry of stones or debris and cushions the affected area whether or not it is medicated. It may also be used with medication. Medication, whether applied to the foot for treatment of a condition or as a preventative, usually dissipates well before the horse is due to be reshod. With the present invention, the packing can be re-medicated as necessary. Those medications having difficulty in penetrating the surface of the packing may be facilitated in their absorption if a small area of the packing surface toward the horse's hoof is abraded. Further, the packing be secured to the horse's hoof as by being placed under a pad which is under the horseshoe and nailed with the shoe to the hoof. The medication may be injected through the packing to the area between the packing and the hoof with a hypodermic needle, thus bypassing the surface. In another embodiment, a small quantity of oil, such as a smear, may be placed on the surface of the packing toward the hoof to serve as a wick to draw the medication and hold it. The packing may be cut to size, folded or layered where necessary, formed to the shape of the frog, if needed, and dressed off cleanly after being mounted under the pad and the horseshoe.

The packing material also works well to securely plug shoe caulk holes. A strip can be cut from the packing sheet, the end twisted and then screwed into the caulk opening such that the material packs into threads. The excess may be trimmed off.

SUMMARY OF THE INVENTION

Thus, the present invention relates to hoofpacking for a horse's hoof having a protective hoof pad attached thereto under a horseshoe and comprising a packing material for application to a horse's hoof under the protective hoof pad that is capable of providing a cushion against bruising while simultaneously forming a water repellent barrier to protect against contamination of the hoof, and the horseshoe nailed to the hoof through the hoof pad and the packing material.

The novel invention also relates to a method of protecting a horse's hoof having a protective hoof pad attached thereto under a horseshoe and comprising the steps of forming a water repellent melt-blown polypropylene packing as a barrier against contamination of the hoof with water, forming the packing in a sheet having a thickness sufficient to provide a cushion against bruising of the horse's hoof, cutting the packing in the desired shape, placing the packing against the bottom of the horse's hoof under the hoof pad and nailing the horseshoe to the hoof through the hoof pad and the protective padding.

BRIEF DESCRIPTION OF THE DRAWINGS

These and other advantages of the present invention will be disclosed in conjunction with the following description of the drawings in which.

DETAILED DESCRIPTION OF THE DRAWINGS

The importance of taking care of horses' hooves is obvious. It is important to both prevent injury to the hoof and to treat any soreness or inflammation of the hoof with proper medication. It also important to protect the hoof from bruising caused by stones or debris.

It is well known in the art that various packings are used under hoof pads to protect hooves and to treat injury to the hooves such as soreness, tenderness, and the like. Prior art packings absorb water and light, allow entry of stones and debris into the hoof, do not remain evenly distributed and shrink when moistened. Thus, they fail to adequately protect the hoof from injury or to medicate it properly if injured for reasons set forth earlier.

Figure 1:
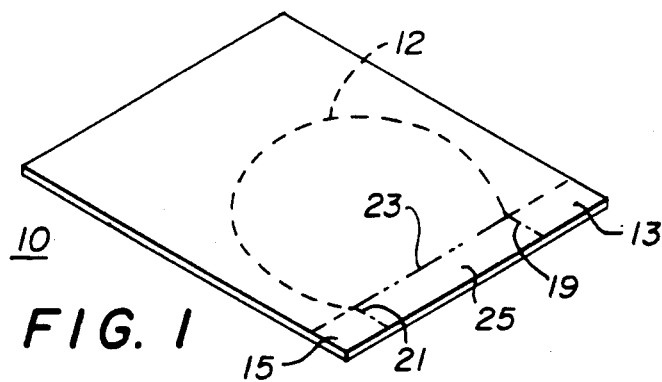
FIG. 1 is a diagrammatic representation of the novel pad illustrating an example of an area to be cut for a particular purpose.
Figure 6:
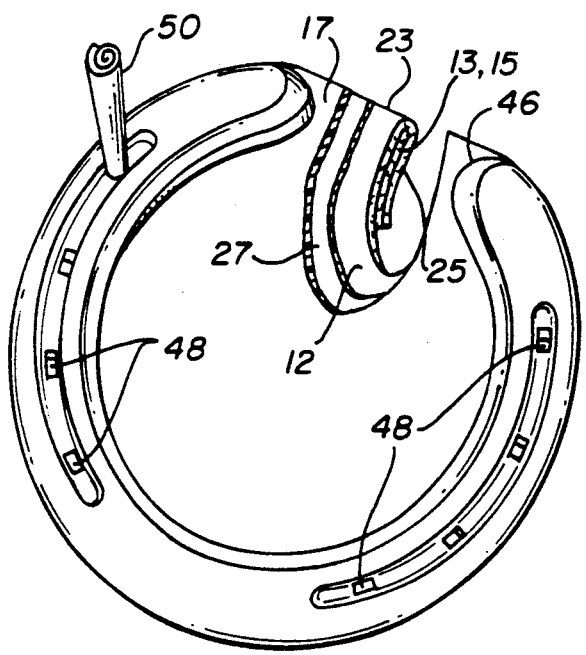
FIG. 6 is a diagrammatic representation of the use of the novel material to plug shoe caulk holes.

The present invention as illustrated in FIG. 1 is a synthetic felt packing formed in sheet form from melt-blown polypropylene fibers that are well-known in the art. It does not absorb water, stays light-weight, and maintains its original size and loft. When medicated, it does not shrink but maintains its original size. It has high tensile strength and is excellent for packing cracks and abscesses and does not separate upon removal. The pad 10 is easily cut into a desired shape such as the entire hoof as indicated by the dashed line 12 to achieve any desired form for application to the hoof or a portion of the hoof as required. It may be cut to size, folded or layered as necessary, formed to the shape of the frog of the hoof, if needed, mounted to the hoof under the shoe as by nailing the shoe to the pad and the hoof, and dressed off cleanly after being mounted under the shoe. Thus, the hoof will be protected from injury with the pad 12 of FIG. 1. Thus, in FIG. 1, the sheet 10 may be cut along the dashed line to form the shape 12 shown including tabs 13 and 15 Tabs 13 and 15 may be folded towards each other about fold lines 19 and 21, respectively, over end area 25. The entire folded end portion may then be folded inwardly about fold line 23 over the main portion of the cut-out packing material 12. This creates a layered area that can conform to the shape of the frog portion of the hoof. FIG. 6 illustrates how the folded packing material 12 fits under a protective foot pad 17 with both the protective pad 17 and the packing 12 being nailed to the hoof with the horseshoe 46.

Further, for added safety, a layer 27 of silicone can be applied between the packing and the protective foot pad 17 as shown in FIG. 6. In this manner the benefits of silicone can be made available without fear of its disadvantages (drying and cracking of the foot) because it is kept from the foot by the novel packing material 12.

Figure 2:
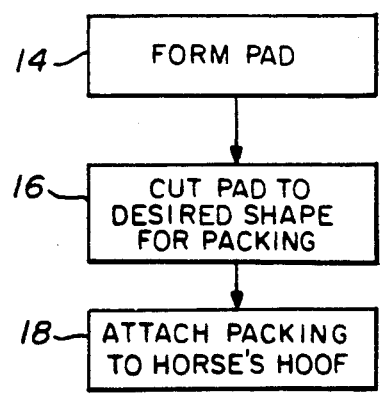
FIG. 2 is a flow chart illustrating those steps for cutting a desired shape from the pad of FIG. 1 and applying the desired shape to a horse's hoof.

FIG. 2 illustrates the steps that are required in utilizing the novel pad of FIG. 1 to protect a horse's hoof. At step 14, the pad is formed of melt-blown polypropylene in a flat sheet as shown in FIG. 1. This flat sheet has all the advantages set forth earlier herein. At step 16, the pad is cut as illustrated, for example only, by dashed line 12 in FIG. 1 to the desired shape such as the entire bottom of the hoof. At step 18, the packing pad 12 is attached to the hoof as, for example, with bandages or nails that fasten the horseshoe to the hoof. Thus, the outline of the horseshoe would generally follow the outline of dashed line 12 and the nails would pass through the horseshoe and the edges of the pad near the dashed line 12 as shown in FIG. 6. The pad may also be cut with tabs 13 and 15 at the rear portion (the edge of sheet 10 in FIG. 1 between the ends of dashed line 12) that may be folded inwardly toward each other and then folded over the area of 12 where the frog is located to provide added material as needed. It may also be used under a protective hoof pad 17 of leather or plastic that may be attached in any well-known manner. The advantageous feature of the steps illustrated in FIG. 2 is that the pad or packing 12 is water resistant and therefore forms a water repellent barrier against contamination. It also stays in place, maintains its original size and loft, does not shrink, bunch or move in any way, and has a high tensile strength.

Figures 3, 4:
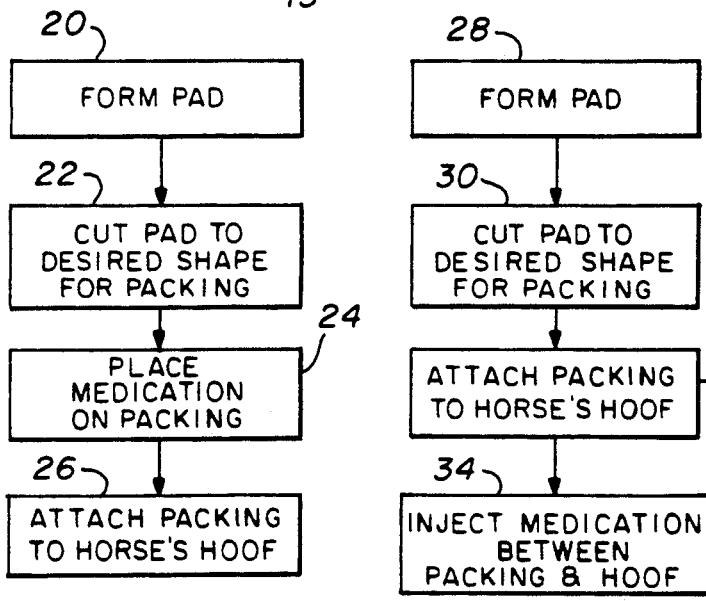
FIG. 3 is a flow chart illustrating the steps of forming the pad for use in applying medication to a horse's hoof.
FIG. 4 is a flow chart illustrating the steps necessary to apply the bandage to the hoof and then injecting medication between the hoof and the pad.

In the novel steps illustrated in FIG. 3, the pad 10 is formed at step 20, is cut to any desired packing shape in step 22, has medication placed on the packing pad at step 24 and, in step 26 the packing pad is again bandaged or otherwise attached to the hoof in any well-known manner. The advantage in this method is that the medication is placed on the packing pad and held in contact with the selected area of the hoof while simultaneously the packing pad forms a water repellent barrier against contamination, maintains its original size and loft even though medicated, maintains its shape without shrinking, does not separate on removal, and prevents entry of stones, debris and other contamination into the hoof area.

In the method illustrated in FIG. 4, the pad 10 is again formed at step 28, cut to the desired size and packing shape at step 30, applied to the hoof and held with a bandage or other fastening means such as nails at step 32 and has the medication injected between the packing pad and the hoof at step 34. This can be done in a well-known manner by the use of a hypodermic needle that can deliver the medication to the area between the hoof and the packing pad. Even though the packing pad may not absorb the medication, it will hold it in contact with the hoof. It can be re-medicated as necessary.

Figure 5:
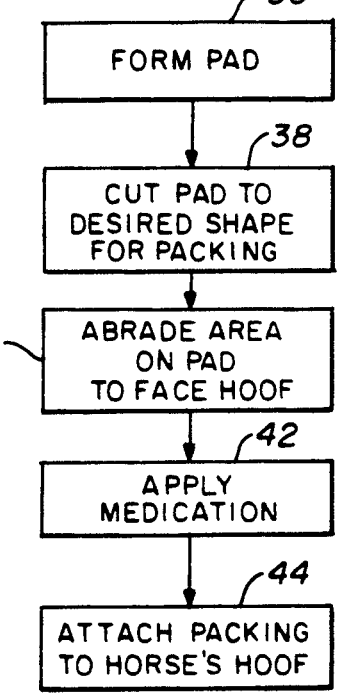
FIG. 5 is a flow chart illustrating the steps required to facilitate absorption of the medication by the abrasion of a portion of the pad's surface.

In the method illustrated by the steps in FIG. 5, preparation is made for those medications which are not readily absorbed into the surface of the packing pad. In this case, the absorption may be facilitated by abrading a small area of the packing pad surface and applying the medication to the abraded area at step 42. The rough surface of the abraded fibers tends to hold liquids. The packing pad is then again attached to the hoof at step 44.

In each of the cases illustrated in FIGS. 2, 3, 4 and 5, the novel pad, being composed of melt-blown polypropylene fibers, does not absorb moisture and thereby forms a water repellent barrier against contamination of the injured area of the hoof with moisture containing bacteria. However, while not absorbing water and by forming the water repellent barrier against contamination, it will hold a medical solution which is to be applied to the hoof. It further provides a cushion against bruising, prevents entry of stones and debris into the hoof area, remains evenly distributed to provide a uniform cushion, may be used under leather or synthetic hoof pads as explained earlier, is clean and easy to use, holds medications to treat fungal and bacterial infections, can be re-medicated as required and does not shrink when medicated.

Further, the novel packing pad may work to securely plug shoe caulk holes when desired. FIG. 6 illustrates a shoe 46 having holes 48 therein. A strip of the material may be cut from the pad 10 in the size desired, the end may be twisted and then screwed into the holes or openings 48 in the shoe as illustrated. A strip of the material 10 may be rolled into a cylindrical or conical shape and inserted into one of the holes 48 that it is desired to plug. It may then be turned in a manner similar to turning a screw into the hole so that material 10 packs into the threads. The excess may simply be trimmed off at the surface of the shoe.

Also as shown in FIG. 6, the protective hoof pad 17 covers the polypropylene packing material 12 and when the shoe 46 is nailed to the horse's hoof the nails pass through the pad 17 and the packing material 12 to securely hold the packing material 12 in place. As stated earlier, the sheet of polypropylene material 10 may be cut to form tabs 13 and 15. These tabs 13 and 15 may be folded inwardly over end area 25 and the complete folded area may be folded over the main body of packing material 12 to form a layered area as shown in the cut away in FIG. 6. Again, a layer 27 of silicone may be added, if desired, between the protective hoof pad 17 and the novel polypropylene packing material 12.

Thus, there has been disclosed an improved synthetic packing for a horse's hoof that may be used for routine packing to protect a horse's hoof or that may be used with medication to treat a horse's hoof. It includes a pad formed of melt-blown polypropylene fibers that can be cut to the desired shape, that does not absorb water and thus forms a water repellent barrier against contamination. It prevents entry of stones and debris into the hoof area, provides added cushioning against bruising, maintains its original size and loft, remains evenly distributed to provide uniform cushion and fill, is easy to use, and does not shrink in size when medicated.

The invention has been described in connection with a preferred embodiment. This description is not intended to limit the scope of the invention to the particular form set forth, but, on the contrary, it is intended to cover such alternatives, modifications, and equivalents as may be included within the spirit and scope of the invention as defined in the appended claims.

I claim:

1. Hoofpacking for horses comprising:
   a polypropylene packing pad cut to the shape of the entire horse hoof for application to a horse hoof to provide a cushion against bruising while simultaneously forming a water repellent barrier to protect against contamination of the hoof;
   a pliable, nonmetallic protective hoof pad cut to the shape of the entire horse hoof and placed over the packing pad so as to be coterminous therewith; and
   a horseshoe placed over the protective hoof pad and nailed to the hoof through both the protective hoof pad and the packing pad.

2. Hoofpacking as in claim 1 wherein the packing pad is capable of holding medication on one side for application to the hoof while providing the water repellent barrier on the other side to protect against contamination of the hoof with contaminated liquid.

3. Hoofpacking as in claim 2 wherein the packing pad is formed of melt-blown polypropylene fibers that do not absorb water, stays lightweight, and maintains its original size and loft.

4. Hoofpacking as in claim 3 wherein the medication is placed and retained between the packing and the hoof.

5. Hoofpacking as in claim 1 further including outwardly extending tabs on each side of the packing pad such that when folded inwardly the tabs form a layered area of said packing material to provide additional support for the hoof frog.

6. A method of protecting a horse's hoof comprising the steps of:
   forming a water repellent polypropylene packing pad as a barrier against contamination of the hoof with liquid;
   forming the packing pad of a thickness sufficient to provide a cushion against bruising of the horse's hoof;
   cutting the packing pad in the shape of the entire horse hoof;
   placing the packing pad against the underside of the horse's hoof;
   placing a protective pliable, nonmetallic hoof pad over and coterminous with the packing pad; and
   nailing a horseshoe to the hoof through both the protective hoof pad and packing pad.

7. A method as in claim 6 further comprising the step of forming the packing pad of melt-blown polypropylene fibers to provide the water barrier on one side and simultaneously hold medication on the other side for treating an injured hoof.

8. A method as in claim 7 further comprising the step of abrading an area of the polypropylene packing pad on the surface toward the horse's hoof to enable the packing pad to absorb medication.

9. A method as in claim 7 further comprising the step of injecting the medication between the packing pad and the hoof with a hypodermic needle after the packing pad has been fastened to the hoof.

10. A method as in claim 7 further comprising the step of placing a smear of oil on the surface of the packing pad toward the horse's hoof to serve as a wick to hold medication.

11. A method as in claim 6 further including the steps of:
    attaching said packing pad to said horse's hoof with bandages; and
    injecting medication between said packing pad and said horse's hoof to treat an injured hoof.

12. A method of securely plugging caulk holes in horseshoes comprising the steps of:
    forming a pad of water repellent material;
    cutting a strip of desired size from the pad;
    twisting the end of the strip;
    screwing the twisted end of the strip into the opening of the horseshoe to be plugged; and
    trimming the excess pad from the horseshoe.

13. A method as in claim 12 further comprising the step of forming the pad of melt-blown polypropylene fibers.

* * * * *